United States Patent [19]

Church

[11] Patent Number: 5,572,423
[45] Date of Patent: Nov. 5, 1996

[54] METHOD FOR CORRECTING SPELLING USING ERROR FREQUENCIES

[75] Inventor: Kenneth W. Church, Chatham, N.J.

[73] Assignee: Lucent Technologies Inc., Murray Hill, N.J.

[21] Appl. No.: 376,693

[22] Filed: Jan. 23, 1995

Related U.S. Application Data

[63] Continuation of Ser. No. 826,294, Jan. 27, 1992, abandoned, which is a continuation of Ser. No. 538,286, Jun. 14, 1990, abandoned.

[51] Int. Cl.$^6$ ........................................... G06F 17/21
[52] U.S. Cl. ................................................ 395/795
[58] Field of Search ...................... 364/419.12, 419.11, 364/419.14

[56] References Cited

U.S. PATENT DOCUMENTS

| | | | |
|---|---|---|---|
| Re. 32,773 | 10/1988 | Goldwasser et al. ................... | 364/419 |
| 4,164,025 | 8/1979 | Dubnowski et al. ............. | 364/900 MS |
| 4,417,319 | 11/1983 | Morimoto et al. ..................... | 364/419 |
| 4,453,217 | 6/1984 | Boivie ..................................... | 364/200 |
| 4,730,269 | 3/1988 | Kucera et al. .......................... | 364/419 |
| 4,771,401 | 9/1988 | Kaufman et al. ....................... | 364/419 |
| 4,783,758 | 11/1988 | Kucera ...................... | 364/900 MS File |
| 4,868,750 | 9/1989 | Kucera et al. .......................... | 364/419 |
| 5,148,367 | 9/1992 | Saito et al. ............................. | 364/419 |
| 5,218,536 | 6/1993 | McWherter ........................ | 364/419.22 |
| 5,258,909 | 11/1993 | Damerau et al. .................. | 364/419.22 |

Primary Examiner—Jack B. Harvey
Assistant Examiner—Xuong M. Chung-Trans

[57] ABSTRACT

An improved method for correcting spelling errors in text wherein candidate expressions for replacing a misspelled word are assigned probability functions. The misspelled word can be replaced automatically with the candidate expression having the highest probability function or candidate expressions can be displayed to a user in rank order of their probability functions for the user to make a choice. The probability function for a candidate expression is based on (1) the probability of occurrence of the candidate expression appearing in text and/or (2) the probability of occurrence of the particular typographical modification needed to convert the candidate expression into the misspelled word.

6 Claims, 7 Drawing Sheets

FIG. 2 del[X, Y] = Deletion of Y after X

Y (Deleted Letter)

| X | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 0 | 8 | 59 | 22 | 4 | 6 | 19 | 9 | 62 | 0 | 5 | 44 | 6 | 54 | 0 | 10 | 0 | 99 | 29 | 54 | 63 | 1 | 0 | 0 | 3 | 0 |
| b | 3 | 3 | 1 | 0 | 23 | 0 | 0 | 0 | 184 | 0 | 0 | 27 | 0 | 0 | 3 | 0 | 0 | 7 | 18 | 0 | 7 | 2 | 0 | 0 | 0 | 0 |
| c | 38 | 0 | 0 | 0 | 64 | 0 | 0 | 25 | 321 | 0 | 10 | 18 | 0 | 0 | 34 | 0 | 0 | 47 | 7 | 55 | 18 | 0 | 0 | 0 | 1 | 0 | EXAMPLE A
| d | 13 | 0 | 8 | 26 | 46 | 0 | 11 | 0 | 63 | 2 | 2 | 9 | 5 | 4 | 4 | 4 | 2 | 12 | 2 | 0 | 4 | 3 | 0 | 0 | 7 | 0 |
| e | 81 | 1 | 51 | 75 | 90 | 4 | 2 | 0 | 7 | 0 | 0 | 33 | 10 | 77 | 20 | 0 | 238 | 238 | 224 | 35 | 9 | 3 | 1 | 8 | 7 | 0 |
| f | 5 | 0 | 0 | 0 | 14 | 47 | 0 | 0 | 80 | 0 | 0 | 13 | 0 | 0 | 5 | 0 | 0 | 12 | 0 | 9 | 1 | 0 | 0 | 0 | 1 | 0 |
| g | 26 | 0 | 0 | 3 | 84 | 1 | 38 | 26 | 40 | 0 | 0 | 4 | 1 | 30 | 5 | 0 | 0 | 53 | 8 | 1 | 23 | 0 | 1 | 0 | 2 | 0 |
| h | 16 | 13 | 1 | 4 | 21 | 0 | 0 | 26 | 25 | 0 | 0 | 8 | 0 | 10 | 23 | 8 | 0 | 16 | 1 | 27 | 0 | 2 | 0 | 0 | 2 | 0 |
| i | 27 | 1 | 61 | 27 | 24 | 2 | 10 | 0 | 1 | 0 | 0 | 39 | 15 | 83 | 42 | 0 | 0 | 17 | 72 | 65 | 1 | 0 | 0 | 0 | 1 | 8 |
| j | 0 | 0 | 0 | 0 | 2 | 0 | 0 | 0 | 0 | 0 | 0 | 0 | 0 | 1 | 2 | 0 | 0 | 0 | 0 | 0 | 0 | 0 | 0 | 0 | 0 | 0 |
| k | 5 | 0 | 2 | 1 | 16 | 1 | 9 | 0 | 6 | 0 | 0 | 4 | 0 | 18 | 0 | 0 | 0 | 1 | 6 | 0 | 1 | 0 | 1 | 0 | 0 | 0 |
| l | 25 | 0 | 0 | 7 | 49 | 0 | 0 | 0 | 218 | 0 | 2 | 212 | 3 | 0 | 30 | 8 | 0 | 3 | 13 | 8 | 4 | 3 | 0 | 0 | 12 | 0 |
| m | 16 | 11 | 0 | 0 | 34 | 0 | 0 | 1 | 43 | 0 | 0 | 0 | 181 | 8 | 8 | 32 | 0 | 0 | 10 | 0 | 5 | 0 | 1 | 0 | 0 | 0 |
| n | 22 | 0 | 43 | 72 | 69 | 1 | 161 | 0 | 192 | 0 | 0 | 0 | 18 | 145 | 22 | 0 | 0 | 0 | 128 | 88 | 44 | 2 | 6 | 0 | 3 | 0 |
| o | 12 | 5 | 4 | 7 | 9 | 0 | 6 | 0 | 5 | 0 | 0 | 14 | 10 | 71 | 27 | 21 | 0 | 0 | 21 | 14 | 48 | 2 | 0 | 0 | 1 | 0 |
| p | 26 | 0 | 0 | 0 | 23 | 0 | 0 | 13 | 16 | 0 | 0 | 29 | 1 | 0 | 31 | 94 | 0 | 99 | 2 | 19 | 3 | 0 | 0 | 0 | 0 | 0 |
| q | 0 | 0 | 0 | 0 | 0 | 0 | 0 | 0 | 0 | 0 | 0 | 0 | 0 | 0 | 0 | 0 | 0 | 59 | 0 | 0 | 19 | 0 | 0 | 0 | 0 | 0 |
| r | 64 | 5 | 13 | 20 | 189 | 0 | 12 | 6 | 133 | 0 | 4 | 34 | 8 | 158 | 22 | 3 | 0 | 278 | 104 | 69 | 0 | 11 | 1 | 0 | 28 | 0 |
| s | 17 | 0 | 28 | 0 | 75 | 2 | 0 | 19 | 232 | 0 | 0 | 3 | 2 | 0 | 31 | 31 | 0 | 5 | 266 | 125 | 22 | 0 | 1 | 0 | 1 | 0 |
| t | 25 | 2 | 3 | 0 | 77 | 1 | 8 | 50 | 428 | 0 | 0 | 32 | 4 | 4 | 12 | 1 | 0 | 204 | 6 | 138 | 15 | 2 | 6 | 0 | 3 | 0 |
| u | 27 | 7 | 10 | 11 | 16 | 0 | 2 | 0 | 29 | 0 | 0 | 40 | 3 | 112 | 2 | 0 | 0 | 130 | 32 | 67 | 0 | 3 | 0 | 0 | 1 | 0 |
| v | 10 | 0 | 0 | 0 | 59 | 1 | 0 | 0 | 32 | 0 | 0 | 0 | 0 | 0 | 3 | 0 | 0 | 1 | 0 | 0 | 0 | 0 | 5 | 0 | 0 | 0 |
| w | 41 | 0 | 0 | 2 | 12 | 0 | 0 | 12 | 16 | 0 | 0 | 2 | 0 | 3 | 0 | 7 | 0 | 3 | 25 | 0 | 0 | 0 | 0 | 0 | 0 | 0 |
| x | 2 | 0 | 18 | 0 | 4 | 0 | 0 | 1 | 0 | 0 | 0 | 0 | 0 | 1 | 1 | 2 | 0 | 0 | 0 | 6 | 0 | 0 | 0 | 0 | 0 | 0 |
| y | 3 | 1 | 35 | 3 | 3 | 0 | 1 | 0 | 1 | 0 | 0 | 0 | 3 | 0 | 6 | 0 | 0 | 0 | 18 | 1 | 0 | 0 | 1 | 0 | 0 | 0 |
| z | 2 | 0 | 0 | 0 | 21 | 0 | 0 | 7 | 21 | 4 | 7 | 23 | 17 | 6 | 6 | 18 | 0 | 0 | 27 | 7 | 3 | 2 | 0 | 0 | 0 | 3 |
| @ | 21 | 15 | 42 | 32 | 21 | 21 | 8 | 0 | 0 | 0 | 0 | 0 | 0 | 0 | 0 | 0 | 0 | 29 | 0 | 0 | 0 | 0 | 25 | 0 | 0 | 3 |

FIG. 3 add[X, Y] = Insertion of Y after X

Y (Inserted Letter)

| X | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 16 | 1 | 15 | 8 | 11 | 0 | 2 | 1 | 33 | 1 | 5 | 31 | 3 | 39 | 13 | 5 | 4 | 28 | 134 | 8 | 28 | 0 | 1 | 1 | 5 | 1 |
| b | 4 | 12 | 0 | 0 | 8 | 0 | 1 | 0 | 50 | 0 | 0 | 16 | 0 | 2 | 2 | 0 | 0 | 6 | 17 | 0 | 0 | 4 | 0 | 0 | 0 | 0 |
| c | 20 | 0 | 54 | 1 | 14 | 0 | 0 | 19 | 50 | 0 | 4 | 2 | 1 | 1 | 8 | 2 | 0 | 8 | 25 | 8 | 9 | 5 | 0 | 0 | 0 | 0 |
| d | 19 | 3 | 4 | 18 | 15 | 3 | 0 | 0 | 10 | 0 | 0 | 7 | 2 | 10 | 14 | 0 | 0 | 7 | 119 | 0 | 0 | 0 | 11 | 0 | 6 | 0 |
| e | 39 | 0 | 9 | 76 | 147 | 3 | 0 | 2 | 5 | 0 | 4 | 5 | 7 | 27 | 6 | 1 | 0 | 83 | (417) | 7 | 5 | 1 | 0 | 3 | 9 | 0 |
| f | 1 | 0 | 0 | 0 | 3 | 27 | 2 | 0 | 13 | 0 | 0 | 11 | 0 | 0 | 0 | 0 | 1 | 6 | 23 | 0 | 1 | 0 | 0 | 0 | 1 | 0 |
| g | 9 | 1 | 0 | 0 | 6 | 2 | 6 | 2 | 9 | 0 | 0 | 3 | 0 | 0 | 1 | 0 | 0 | 6 | 69 | 3 | 4 | 0 | 6 | 0 | 0 | 0 |
| h | 5 | 0 | 0 | 1 | 24 | 0 | 11 | 13 | 18 | 3 | 0 | 1 | 0 | 1 | 5 | 2 | 1 | 17 | 24 | 22 | 1 | 0 | 1 | 0 | 4 | 0 |
| i | 11 | 4 | 14 | 0 | 25 | 0 | 1 | 19 | 69 | 3 | 0 | 18 | 12 | 33 | 27 | 0 | 0 | 10 | 30 | 29 | 12 | 2 | 0 | 0 | 0 | 0 |
| j | 0 | 0 | 0 | 2 | 0 | 0 | 0 | 1 | 0 | 0 | 0 | 0 | 0 | 0 | 0 | 0 | 0 | 0 | 0 | 0 | 1 | 0 | 0 | 0 | 0 | 0 |
| k | 3 | 5 | 0 | 2 | 10 | 0 | 0 | 0 | 2 | 0 | 0 | 2 | 0 | 0 | 3 | 0 | 0 | 0 | 0 | 8 | 1 | 1 | 0 | 0 | 5 | 0 |
| l | 4 | 1 | 0 | 0 | 38 | 0 | 0 | 0 | 79 | 0 | 3 | 128 | 1 | 0 | 8 | 3 | 0 | 0 | 95 | 1 | 4 | 2 | 0 | 0 | 3 | 0 |
| m | 12 | 2 | 1 | 0 | 18 | 5 | 0 | 0 | 7 | 0 | 1 | 0 | 102 | 44 | 8 | 0 | 0 | 0 | 97 | 8 | 3 | 2 | 1 | 0 | 0 | 2 |
| n | 16 | 6 | 8 | 14 | 52 | 3 | 18 | 3 | 34 | 0 | 1 | 2 | 26 | 99 | 13 | 3 | 0 | 3 | 47 | 1 | 2 | 2 | 0 | 0 | 1 | 0 |
| o | 15 | 2 | 1 | 4 | 8 | 0 | 1 | 50 | 28 | 0 | 0 | 7 | 4 | 14 | 64 | 30 | 0 | 156 | 53 | 8 | 20 | 2 | 1 | 0 | 0 | 2 |
| p | 23 | 0 | 0 | 1 | 11 | 0 | 0 | 24 | 4 | 0 | 2 | 3 | 0 | 26 | 13 | 70 | 0 | 17 | 59 | 5 | 1 | 1 | 1 | 0 | 0 | 0 |
| q | 0 | 0 | 0 | 0 | 0 | 0 | 0 | 1 | 1 | 0 | 0 | 0 | 1 | 0 | 0 | 0 | 0 | 29 | 52 | 10 | 0 | 0 | 0 | 0 | 0 | 0 |
| r | 16 | 3 | 2 | 0 | 89 | 2 | 2 | 3 | 64 | 0 | 3 | 6 | 10 | 8 | 0 | 0 | 0 | 132 | 273 | 29 | 8 | 0 | 0 | 0 | 11 | 0 |
| s | 14 | 1 | 8 | 20 | 41 | 2 | 11 | 50 | 101 | 0 | 2 | 3 | 11 | 8 | 11 | 1 | 1 | 2 | (205) | 49 | 8 | 0 | 1 | 0 | 8 | 0 |
| t | 39 | 0 | 0 | 4 | 65 | 0 | 0 | 24 | 59 | 1 | 0 | 7 | 4 | 2 | 4 | 2 | 0 | 54 | 264 | 183 | 12 | 2 | 1 | 0 | 7 | 0 |
| u | 16 | 0 | 4 | 0 | 10 | 0 | 2 | 1 | 24 | 0 | 3 | 4 | 4 | 10 | 23 | 4 | 1 | 49 | 20 | 27 | 26 | 6 | 1 | 3 | 4 | 0 |
| v | 0 | 0 | 0 | 0 | 36 | 0 | 0 | 1 | 11 | 0 | 2 | 1 | 0 | 2 | 2 | 1 | 0 | 0 | 0 | 0 | 1 | 0 | 0 | 0 | 0 | 0 |
| w | 0 | 0 | 0 | 0 | 11 | 0 | 0 | 2 | 2 | 0 | 0 | 1 | 1 | 3 | 0 | 0 | 0 | 1 | 9 | 0 | 3 | 0 | 0 | 0 | 0 | 0 |
| x | 0 | 0 | 1 | 0 | 2 | 1 | 0 | 7 | 2 | 0 | 0 | 0 | 0 | 0 | 4 | 0 | 0 | 0 | 3 | 0 | 0 | 0 | 0 | 3 | 0 | 0 |
| y | 6 | 0 | 3 | 0 | 4 | 0 | 1 | 0 | 3 | 0 | 0 | 0 | 1 | 7 | 0 | 0 | 0 | 2 | 33 | 2 | 14 | 0 | 2 | 0 | 0 | 3 |
| z | 3 | 1 | 0 | 0 | 6 | 1 | 0 | 0 | 7 | 2 | 0 | 6 | 0 | 3 | 3 | 0 | 0 | 0 | 0 | 0 | 0 | 1 | 0 | 0 | 3 | 5 |
| @ | (46) | 9 | 10 | 9 | 26 | 12 | 15 | 4 | 6 | 0 | 18 | 6 | 7 | 0 | 3 | 11 | 0 | 7 | 23 | 3 | 12 | 2 | 3 | 1 | 2 | 3 |

EXAMPLE F (column s)
EXAMPLE B (column a, row @: 46)
EXAMPLE G (row z)

FIG. 4 sub[X, Y] = Substitution of X (incorrect) for Y (correct)

Y (correct)

| X | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 0 | 0 | 7 | 2 | 342 | 1 | 1 | 3 | 118 | 0 | 2 | 1 | 1 | 4 | 76 | 0 | 1 | 2 | 35 | 9 | 9 | 0 | 2 | 0 | 6 | 1 |
| b | 1 | 0 | 9 | 9 | 3 | 3 | 4 | 2 | 0 | 0 | 0 | 6 | 11 | 6 | 0 | 10 | 0 | 1 | 3 | 2 | 2 | 1 | 8 | 0 | 0 | 1 |
| c | 7 | 6 | 0 | 16 | 1 | 9 | 6 | 0 | 0 | 0 | 2 | 6 | 7 | 9 | 2 | 10 | 3 | 6 | 39 | 40 | 2 | 4 | 7 | 2 | 2 | 0 |
| d | 2 | 10 | 13 | 0 | 12 | 1 | 6 | 6 | 0 | 0 | 3 | 4 | 7 | 4 | 1 | 2 | 0 | 43 | 30 | 22 | 0 | 0 | 5 | 0 | 3 | 0 |
| e | 388 | 0 | 4 | 11 | 0 | 3 | 3 | 1 | 89 | 0 | 0 | 4 | 1 | 6 | 93 | 1 | 0 | 14 | 12 | 7 | 15 | 1 | 2 | 0 | 18 | 0 |
| f | 0 | 15 | 1 | 4 | 0 | 0 | 6 | 3 | 1 | 0 | 2 | 4 | 5 | 2 | 0 | 1 | 4 | 7 | 5 | 12 | 0 | 1 | 3 | 1 | 0 | 0 |
| g | 5 | 2 | 11 | 11 | 9 | 3 | 0 | 1 | 0 | 1 | 0 | 4 | 0 | 1 | 3 | 2 | 0 | 6 | 13 | 21 | 0 | 1 | 2 | 0 | 4 | 1 |
| h | 2 | 8 | 1 | 4 | 1 | 1 | 0 | 0 | 1 | 0 | 2 | 0 | 12 | 14 | 3 | 4 | 0 | 4 | 2 | 11 | 0 | 1 | 3 | 2 | 0 | 0 |
| i | 103 | 0 | 0 | 0 | 140 | 0 | 2 | 0 | 0 | 0 | 0 | 7 | 1 | 1 | 49 | 1 | 0 | 1 | 3 | 2 | 47 | 1 | 3 | 0 | 15 | 1 |
| j | 0 | 2 | 2 | 9 | 0 | 0 | 2 | 6 | 0 | 0 | 0 | 3 | 2 | 1 | 0 | 1 | 0 | 1 | 6 | 0 | 1 | 0 | 3 | 2 | 0 | 0 |
| k | 2 | 3 | 8 | 5 | 2 | 2 | 3 | 7 | 0 | 0 | 0 | 0 | 6 | 1 | 3 | 6 | 0 | 1 | 7 | 3 | 0 | 0 | 5 | 0 | 1 | 0 |
| l | 3 | 10 | 2 | 5 | 0 | 5 | 6 | 7 | 13 | 0 | 2 | 0 | 1 | 0 | 3 | 1 | 0 | 1 | 10 | 15 | 13 | 4 | 3 | 3 | 4 | 4 |
| m | 2 | 4 | 7 | 8 | 1 | 3 | 0 | 7 | 2 | 0 | 5 | 5 | 0 | 14 | 0 | 6 | 0 | 1 | 9 | 6 | 0 | 0 | 2 | 0 | 0 | 0 |
| n | 3 | 7 | 7 | 6 | 4 | 0 | 2 | 19 | 25 | 9 | 5 | 35 | 0 | 0 | 0 | 7 | 0 | 28 | 6 | 5 | 5 | 0 | 0 | 3 | 18 | 3 |
| o | 91 | 2 | 2 | 4 | 116 | 7 | 1 | 0 | 3 | 1 | 3 | 3 | 78 | 180 | 0 | 14 | 0 | 3 | 5 | 14 | 39 | 4 | 2 | 0 | 0 | 0 |
| p | 0 | 11 | 2 | 3 | 0 | 0 | 6 | 1 | 0 | 0 | 0 | 0 | 0 | 0 | 0 | 0 | 0 | 2 | 4 | 7 | 0 | 0 | 0 | 0 | 0 | 0 |
| q | 0 | 0 | 2 | 0 | 0 | 0 | 27 | 0 | 0 | 2 | 0 | 6 | 7 | 1 | 15 | 0 | 0 | 0 | 0 | 0 | 5 | 0 | 2 | 0 | 0 | 0 |
| r | 1 | 14 | 1 | 30 | 12 | 3 | 3 | 8 | 3 | 2 | 6 | 8 | 5 | 7 | 2 | 14 | 0 | 0 | 12 | 22 | 1 | 1 | 6 | 2 | 20 | 2 |
| s | 11 | 8 | 27 | 33 | 35 | 5 | 1 | 2 | 1 | 0 | 1 | 27 | 0 | 0 | 2 | 7 | 1 | 14 | 0 | 15 | 0 | 3 | 19 | 4 | 7 | 7 |
| t | 4 | 5 | 9 | 42 | 7 | 6 | 19 | 6 | 25 | 2 | 0 | 14 | 9 | 6 | 6 | 0 | 0 | 11 | 37 | 0 | 0 | 0 | 3 | 0 | 8 | 0 |
| u | 20 | 1 | 0 | 1 | 44 | 0 | 1 | 0 | 3 | 0 | 0 | 0 | 0 | 3 | 43 | 7 | 0 | 5 | 0 | 4 | 4 | 0 | 0 | 0 | 0 | 0 |
| v | 0 | 3 | 7 | 1 | 0 | 4 | 0 | 3 | 0 | 0 | 2 | 2 | 0 | 1 | 2 | 0 | 0 | 1 | 8 | 4 | 2 | 0 | 1 | 0 | 1 | 0 |
| w | 3 | 3 | 2 | 3 | 2 | 0 | 1 | 0 | 0 | 0 | 0 | 1 | 0 | 1 | 0 | 2 | 0 | 7 | 4 | 4 | 0 | 3 | 0 | 0 | 1 | 0 |
| x | 1 | 1 | 1 | 1 | 0 | 0 | 1 | 0 | 0 | 0 | 1 | 0 | 3 | 0 | 0 | 0 | 0 | 2 | 9 | 8 | 2 | 0 | 1 | 0 | 1 | 0 |
| y | 0 | 0 | 3 | 7 | 15 | 0 | 2 | 7 | 15 | 0 | 0 | 7 | 3 | 0 | 7 | 7 | 0 | 7 | 36 | 4 | 6 | 0 | 1 | 0 | 0 | 1 |
| z | 0 | 0 | 0 | 0 | 0 | 0 | 0 | 0 | 1 | 0 | 1 | 7 | 6 | 0 | 0 | 0 | 0 | 3 | 21 | 4 | 0 | 0 | 0 | 1 | 4 | 0 |

EXAMPLE E: row e, column o = 93

EXAMPLE D: row r, column c = 1

FIG. 5

EXAMPLE C rev[X, Y] = Reversal of XY

| X\Y | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 0 | 1 | (1) | 0 | 2 | 0 | 5 | 12 | 15 | 0 | 0 | 11 | 9 | 15 | 5 | 17 | 0 | 12 | 5 | 5 | 22 | 0 | 0 | 0 | 0 | 0 |
| b | 1 | 0 | 0 | 0 | 3 | 1 | 0 | 0 | 1 | 0 | 0 | 2 | 2 | 0 | 3 | 1 | 0 | 0 | 3 | 5 | 1 | 0 | 0 | 0 | 0 | 0 |
| c | 1 | 0 | 0 | 0 | 2 | 0 | 0 | 2 | 85 | 0 | 0 | 15 | 0 | 0 | 13 | 0 | 0 | 0 | 4 | 0 | 7 | 0 | 0 | 0 | 0 | 0 |
| d | 0 | 0 | 0 | 5 | 0 | 0 | 0 | 0 | 7 | 0 | 0 | 1 | 1 | 16 | 0 | 3 | 0 | 2 | 0 | 1 | 3 | 0 | 0 | 1 | 3 | 0 |
| e | 2 | 0 | 5 | 0 | 0 | 0 | 1 | 0 | 60 | 0 | 0 | 21 | 6 | 15 | 11 | 3 | 0 | 29 | 5 | 0 | 85 | 0 | 0 | 1 | 3 | 0 |
| f | 0 | 0 | 0 | 1 | 0 | 0 | 0 | 0 | 12 | 0 | 0 | 2 | 0 | 0 | 1 | 0 | 0 | 4 | 0 | 1 | 0 | 0 | 0 | 0 | 0 | 0 |
| g | 5 | 0 | 0 | 0 | 3 | 2 | 0 | 0 | 0 | 0 | 0 | 2 | 0 | 5 | 0 | 1 | 2 | 1 | 0 | 0 | 4 | 6 | 0 | 0 | 1 | 0 |
| h | 12 | 1 | 1 | 0 | 15 | 0 | 4 | 0 | 1 | 0 | 0 | 2 | 0 | 0 | 11 | 1 | 0 | 13 | 1 | 10 | 0 | 0 | 0 | 0 | 0 | 4 |
| i | 15 | 8 | 31 | 4 | 66 | 0 | 3 | 0 | 0 | 0 | 0 | 9 | 0 | 0 | 0 | 0 | 2 | 0 | 42 | 35 | 0 | 6 | 0 | 0 | 0 | 0 |
| j | 0 | 0 | 0 | 0 | 0 | 0 | 0 | 0 | 0 | 0 | 0 | 0 | 0 | 0 | 0 | 0 | 0 | 0 | 0 | 0 | 4 | 0 | 0 | 0 | 0 | 0 |
| k | 0 | 0 | 0 | 0 | 3 | 0 | 2 | 0 | 5 | 0 | 0 | 0 | 0 | 0 | 2 | 0 | 0 | 0 | 0 | 0 | 0 | 0 | 0 | 0 | 0 | 0 |
| l | 11 | 0 | 0 | 12 | 20 | 0 | 0 | 0 | 2 | 0 | 0 | 0 | 4 | 0 | 2 | 4 | 0 | 0 | 2 | 2 | 4 | 6 | 0 | 0 | 7 | 0 |
| m | 9 | 1 | 0 | 0 | 20 | 0 | 8 | 0 | 5 | 0 | 0 | 0 | 0 | 0 | 2 | 22 | 0 | 0 | 0 | 0 | 5 | 0 | 0 | 0 | 0 | 0 |
| n | 15 | 0 | 6 | 3 | 12 | 0 | 1 | 0 | 0 | 0 | 0 | 3 | 0 | 0 | 2 | 1 | 0 | 0 | 6 | 5 | 1 | 1 | 0 | 0 | 0 | 0 |
| o | 5 | 0 | 3 | 0 | 5 | 0 | 0 | 0 | 14 | 0 | 3 | 5 | 3 | 7 | 0 | 3 | 0 | 5 | 2 | 6 | 1 | 0 | 7 | 0 | 0 | 0 |
| p | 17 | 0 | 0 | 0 | 5 | 0 | 4 | 1 | 15 | 0 | 1 | 5 | 1 | 0 | 30 | 2 | 0 | 11 | 4 | 3 | 1 | 0 | 0 | 0 | 1 | 0 |
| q | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| r | 12 | 0 | 1 | 0 | 24 | 0 | 0 | 5 | 49 | 0 | 0 | 3 | 2 | 0 | 2 | 3 | 0 | 5 | 0 | 2 | 10 | 0 | 3 | 0 | 3 | 0 |
| s | 5 | 1 | 1 | 2 | 9 | 0 | 3 | 21 | 3 | 0 | 3 | 5 | 0 | 1 | 4 | 0 | 0 | 11 | 1 | 6 | 4 | 0 | 0 | 0 | 0 | 0 |
| t | 5 | 0 | 4 | 0 | 5 | 0 | 0 | 0 | 5 | 0 | 1 | 3 | 2 | 0 | 20 | 2 | 0 | 11 | 0 | 2 | 11 | 0 | 3 | 0 | 8 | 0 |
| u | 22 | 2 | 5 | 2 | 2 | 0 | 0 | 0 | 1 | 0 | 0 | 0 | 0 | 2 | 2 | 3 | 0 | 0 | 1 | 3 | 0 | 0 | 0 | 0 | 0 | 0 |
| v | 0 | 0 | 0 | 0 | 0 | 0 | 0 | 0 | 0 | 0 | 0 | 4 | 0 | 0 | 0 | 0 | 0 | 0 | 0 | 0 | 0 | 0 | 0 | 0 | 0 | 0 |
| w | 0 | 0 | 0 | 0 | 0 | 0 | 0 | 0 | 0 | 0 | 0 | 0 | 0 | 0 | 0 | 2 | 0 | 0 | 1 | 0 | 0 | 0 | 0 | 0 | 0 | 0 |
| x | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| y | 0 | 2 | 3 | 0 | 0 | 0 | 0 | 0 | 0 | 0 | 0 | 0 | 0 | 0 | 0 | 0 | 0 | 2 | 0 | 0 | 0 | 0 | 1 | 0 | 0 | 0 |
| z | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 6 chars[X, Y] = Observations of character X followed by character Y

| X \ Y | a (EXAMPLE C) | b | c | d | ... | s | t (EXAMPLE A) | u | v | w | x | y | z |
|---|---|---|---|---|---|---|---|---|---|---|---|---|---|
| a | 249 | 236778 | 497631 | 504303 | ... | 1172648 | 1790672 | 155540 | 267563 | 90464 | 22350 | 307993 | 12846 |
| b | 194921 | 11926 | 3014 | 2446 | ... | 39676 | 14092 | 237623 | 2443 | 679 | 13 | 235366 | 44 |
| c | 581247 | 2 | 102150 | 322 | ... | 21261 | 470573 | 183533 | 6 | 1 | 2 | 58201 | 260 |
| d | 187396 | 1961 | 6289 | 47959 | ... | 127996 | 561 | 174107 | 25790 | 5548 | 1 | 53121 | 20 |
| e | 954504 | 41591 | 604573 | 1912388 | ... | 1585940 | 474087 | 12055 | 249390 | 167764 | 209693 | 150749 | 3620 |
| f | 179946 | 124 | 150 | 21 | ... | 7222 | 132138 | 106061 | 0 | 428 | 7 | 10970 | 1 |
| g | 218592 | 330 | 9 | 1226 | ... | 67553 | 8659 | 98798 | 1 | 290 | 0 | 14407 | 26 |
| h | 1176622 | 8392 | 473 | 10632 | ... | 29661 | 170837 | 61931 | 11 | 8560 | 0 | 22200 | 2 |
| i | 287135 | 76011 | 766311 | 937795 | ... | 1111946 | 1209119 | 7929 | 307828 | 166 | 21887 | 116 | 72252 |
| j | 13714 | 1 | 4 | 1 | ... | 1 | 2 | 84510 | 0 | 0 | 0 | 0 | 0 |
| k | 7675 | 818 | 78 | 1990 | ... | 90873 | 970 | 2238 | 3 | 851 | 1 | 3992 | 0 |
| l | 631758 | 2849 | 8470 | 362691 | ... | 229150 | 102013 | 129227 | 33668 | 7010 | 1 | 413909 | 10 |
| m | 577032 | 106847 | 124 | 57 | ... | 93006 | 259 | 94562 | 138 | 188 | 0 | 42648 | 1 |
| n | 345295 | 1720 | 468562 | 1561397 | ... | 553188 | 1375781 | 98136 | 97485 | 9102 | 928 | 124585 | 1075 |
| o | 79839 | 86083 | 159522 | 180569 | ... | 359730 | 525432 | 1052826 | 280299 | 368642 | 8667 | 52053 | 8166 |
| p | 404211 | 814 | 938 | 633 | ... | 62435 | 83920 | 126249 | 36 | 1100 | 3 | 8385 | 0 |
| q | 11 | 1 | 0 | 0 | ... | 2 | 1 | 132197 | 0 | 0 | 0 | 0 | 0 |
| r | 742930 | 23738 | 218358 | 190901 | ... | 616260 | 469172 | 148781 | 85073 | 10955 | 2 | 252843 | 82 |
| s | 794691 | 6222 | 141031 | 2249 | ... | 406241 | 1377082 | 349688 | 51 | 26773 | 0 | 39167 | 2 |
| t | 610173 | 4884 | 26400 | 1904 | ... | 522360 | 2106650 | 209686 | 32 | 104386 | 1 | 194055 | 628 |
| u | 110481 | 89616 | 183288 | 135506 | ... | 462580 | 551995 | 358 | 2081 | 11 | 1546 | 16895 | 785 |
| v | 104962 | 3 | 6 | 6 | ... | 2481 | 7 | 1409 | 114 | 2 | 0 | 6121 | 0 |
| w | 531131 | 1231 | 500 | 7960 | ... | 66965 | 6855 | 213 | 1 | 23 | 2 | 9065 | 2 |
| x | 11771 | 1 | 21813 | 0 | ... | 8 | 43180 | 5938 | 2 | 10 | 406 | 1468 | 0 |
| y | 9164 | 9612 | 8223 | 1712 | ... | 111485 | 11154 | 405 | 21 | 3526 | 75 | 3 | 1160 |
| z | 19024 | 1 | 7 | 5 | ... | 3 | 6 | 830 | 67 | 19 | 0 | 1450 | 3365 |
| @ | 4069296 | 14739925 | 1637942 | 981811 | ... | 2534082 | 5186047 | 328576 | 223468 | 1955331 | 436 | 200418 | 5179 |

FIG. 7 chars[X] = Observations of character X

| | |
|---|---|
| a | 11852441 |
| b | 2161532 |
| c | (4747178) — EXAMPLE D |
| d | 2732512 |
| e | (13128963) — EXAMPLE F |
| f | 2453329 |
| g | 1920284 |
| h | 6498269 |
| i | 11523000 |
| j | 200689 |
| k | 698498 |
| l | 5062661 |
| m | 3112531 |
| n | 8039667 |
| o | (10234105) — EXAMPLE E |
| p | 3247744 |
| q | 132328 |
| r | 7822982 |
| s | (6009135) — EXAMPLE G |
| t | 11125501 |
| u | 3765568 |
| v | 1575422 |
| w | 2520152 |
| x | 223370 |
| y | 532776 |
| z | 108296 |
| @ | (32158917) — EXAMPLE B |

METHOD FOR CORRECTING SPELLING USING ERROR FREQUENCIES

This application is a continuation of application Ser. No. 07/826,294, filed on Jan. 27, 1992 now abandoned, which is a continuation of Ser. No. 07/538,286, filed on Jun. 14, 1990 (now abandoned).

FIELD OF THE INVENTION

This invention relates to methods for correcting spelling in text and, more specifically, for estimating which of a group of potential candidate expressions was probably intended by the author of the text.

BACKGROUND OF THE INVENTION

Word processing programs typically include a "spell capability" which identifies potentially misspelled words not found in a dictionary associated with the program. Many such programs also use an algorithm, which adds, deletes, substitutes, and transposes characters to generate a list of potential candidate expressions. For example, the commercially available SAMNA word processing package uses a "proof" function to detect the misspelled word "acress" and suggests the following possible candidate expressions in the order noted: "acres, cares, caress, across, caries, accrues, cashes, access." Candidates "acres", "caress", and "access" appear to be logical choices of intended words while "cares", "accrues", and "cashes" appear to be much less plausible choices. An object of my invention is to better identify the plausible candidates from those that e less plausible or implausible.

U.S. Pat. No. 4,783,758, issued Nov. 8, 1988, describes a process for comparing the potentially misspelled word with each candidate expression to produce a "disparity value, which numerically represents the structural differences between the two expressions." Established pity values are assigned, pursuant to formulas, for deletions, transpositions, etc. without regard to which particular character is modified.

SUMMARY OF THE INVENTION

In accordance with the principles of my invention, an improved method is disclosed for estimating the likelihood that a candidate expression derived from a misspelled (e.g., mistyped) word was the word intended by the author of the text. For each candidate expression I derive two independent probability figures: (1) the probability of occurrence of the candidate expression in text, and (2) the probability in text of the occurrence of the particular typographical modification (i.e., character deletion, insertion, substitution, or transposition) used to generate the misspelled word from the candidate expression. The two probability figures for each candidate are then advantageously used to generate an overall probability number for each candidate. To simplify computations and reduce storage requirements, a user, willing to accept diminished accuracy, can use an overall probability number computed using only one of the two derived probability of occurrence figures—preferably that related to the occurrence of the particular typographical modification.

After generation of the overall probability number, the candidates are then rank ordered, if desired, using the overall probability number. Depending upon the needs of users, the most probable expression can be selected, suggested as a possible replacement, and/or used to replace the misspelled word either with or without human intervention. As described hereinafter, in one specific embodiment of my invention, the candidates "actress", "acres", and "across" were identified as plausible candidates for the misspelled word "acress" while "cress", "caress" and "access" were identified as essentially implausible.

In accordance with a feature of my invention, the two above-referenced occurrence probabilities are derived by analysis of a very large corpus of text and are updated to reflect candidates (and therefore corresponding typing errors) selected by users using my method. Thus, both sets of probability figures improve over time as they are "trained" by the users of the method.

BRIEF DESCRIPTION OF THE DRAWING

Further features and advantages of my invention will become apparent from the following detailed description, taken together with the drawing, in which:

FIGS. 2 through 5 are matrices respectively reflecting single character deletion, insertion, substitution and reversal data derived from analysis of the corpus; and FIGS. 6 and 7 are matrices reflecting the number of times particular representative characters appeared singly and in combination in the corpus.

DESCRIPTION OF THE ILLUSTRATIVE EMBODIMENT

Figure 1:
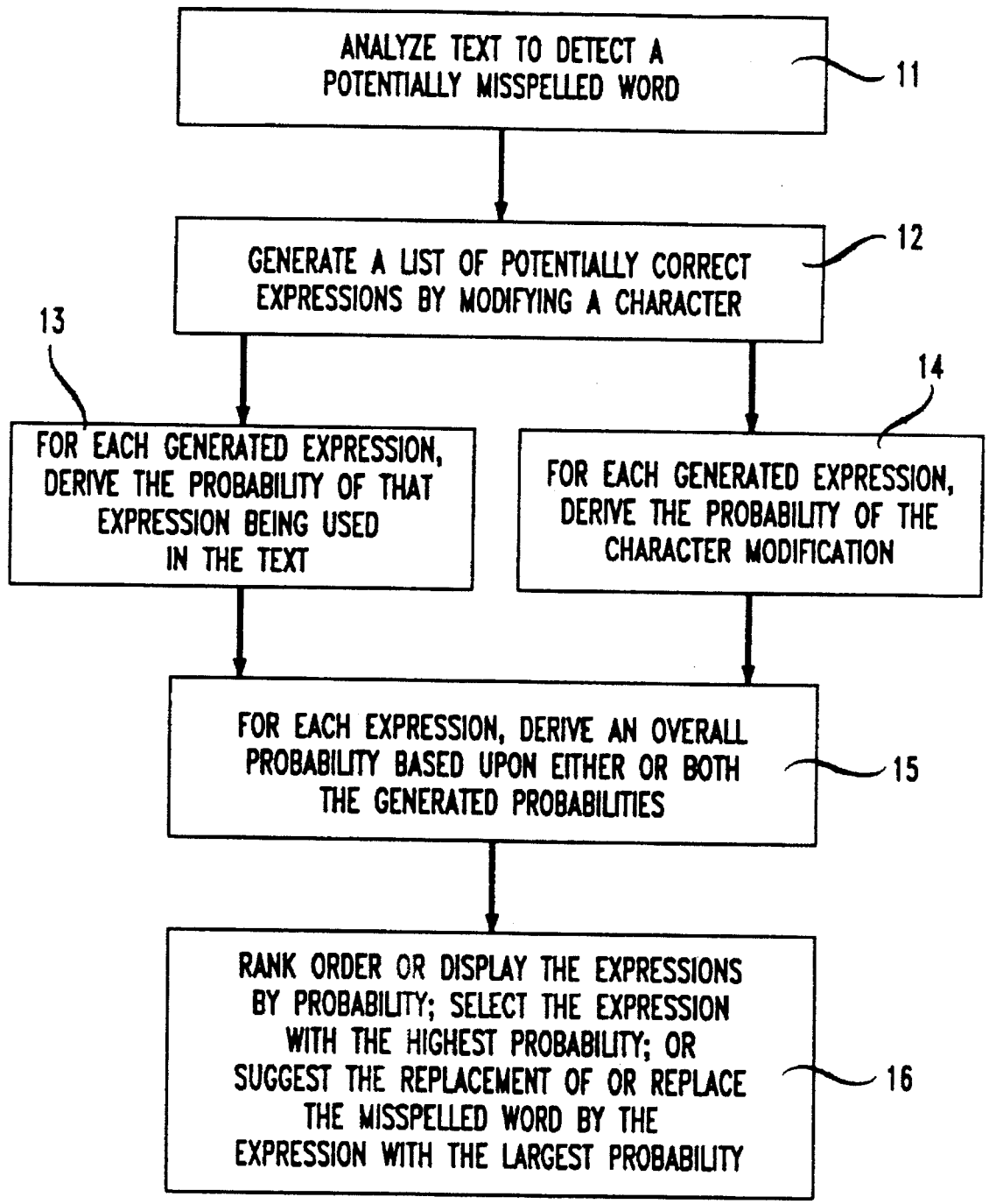
FIG. 1 is a flow diagram of the candidate selection method according to my invention.

The commercially available UNIX™ operating system includes the well known "spell" command which is adapted to identify potentially misspelled words (step 11, FIG. 1). A list of potential candidate words is then generated by analyzing valid expressions in the "spell dictionary" that differ by a single insertion, deletion, substitution or reversal from the misspelled word (step 12, FIG. 1). Thus, single character insertion, deletion, substitution and reversal is used on the misspelled word "acress" to generate the candidates as follows:

| | |
|---|---|
| actress | deletion of "t" |
| cress | insertion of "a" |
| caress | reversal of "ca" |
| access | substitution of "r" for "c" |
| across | substitution of "e" for "o" |
| acres | insertion of "s" |

As noted above, the candidate "actress" can be mistyped as "acress" by deleting the "t" between "ac" and "ress". "Cress" can also be mistyped as "acress" by inserting an initial "a". The other candidates are similarly derived as noted above.

The table below illustrates this candidate generation step of the process in more detail—including also the character position where the modification occurs. Positions "0" through "5" refer respectively to the first through sixth characters of the misspelled word "acress".

TABLE A

| Misspelled Word | Correction Candidate | Transform | Position | Transformation |
|---|---|---|---|---|
| acress | actress | delete t after c | 2 | deletion |
| acress | cress | insert a after @ | 0 | insertion |
| acress | caress | reverse ca | 0 | reversal |
| acress | access | substitute r for c | 2 | substitution |

TABLE A-continued

| Misspelled Word | Correction Candidate | Transform | Position | Transformation |
|---|---|---|---|---|
| acress | across | substitute e for o | 3 | substitution |
| acress | acres | insert s after e | 4 | insertion |
| acress | acres | insert s after s | 5 | insertion |

The above table illustrates that the misspelled word "acress" can be generated from "acres" by insertion of the letter "s" in character position 4 of "acres" or insertion of the letter "s" in character position 5 of "acres".

The insertion and transformation operations are implemented in a straightforward way by nondeterministically trying all possibilities. Therefore, n dictionary accesses are required to see if the n(th) letter in the misspelled word may have been inserted erroneously. The deletion operation is more complicated since there are 26 letters that might have been deleted in n+1 positions. In order to reduce the number of dictionary accesses, I use a precomputed deletion table which maps words missing a letter to corrections. A sample table for the word "great" follows:

TABLE B

| Key | Deletion | |
|---|---|---|
| | Correction | |
| grea | t | 4 |
| gret | a | 3 |
| grat | e | 2 |
| geat | r | 1 |
| reat | g | 0 |

Again, correction positions "0" through "4" correspond to characters "1" through "5" of the word "great". The deletion table is also useful in checking for substitutions.

For each correction candidate, step 13 in FIG. 1 derives a first probability function, Pr(correction), indicating the probability of that candidate being used in the text. The function Pr(correction) is estimated by the expression (freq(correction)+1)/N, where freq(correction) is the number of times that the word "correction" appears in the large text corpus and where N is the total number of words in the corpus. The corpus used in my illustrative embodiment contained some 32 million words. A large table (not shown because it has four hundred thousand entries) contains each word in the vocabulary and stores data reflecting the number of times each such word appeared in the corpus.

As described in Table C below, a second probability function, Pr(typo/correction), is also derived for each correction candidate and reflects the probability of occurrence of the particular typographical modification (i.e., deletion, insertion, reversal or substitution) used to generate the misspelled word from the candidate expression. For this probability function, (1)del[x,y] is the number of times that the character y was deleted after the character x in the "training" corpus (i.e., xy typed as x), (2) add[x,y] is the number of times that y was inserted after x (i.e., x typed as xy); (3) sub[x,y] is the number of times that y (from the correct word) was typed as x (i.e., y typed as x); (4) rev[x,y] is number of times that xy was reversed (i.e., xy typed as yx); and (5) chars[x,y] and chars[x] are the number of times that xy and x respectively appeared in the corpus. The computation of this probability function will be described hereinafter with respect to the misspelled word "acress".

TABLE C $$Pr(typo|cor) = \begin{cases} del\ [cor_{p-1}, cor_p]/chars[cor_{p-1}, cor_p] & \text{if deletion} \\ add\ [cor_{p-1}, typo_p]/chars[cor_{p-1}] & \text{if insertion} \\ sub\ [typo_p, cor_p]/chars[cor_p] & \text{if substitution} \\ rev\ [cor_p, cor_{p+1}]/chars[cor_p, cor_{p+1}] & \text{if reversal} \end{cases}$$

FIGS. 2 through 5 are matrices which respectively reflect single character deletion, insertion, substitution, and reversal data. The data in the matrices was derived by examining the corpus for misspelled words, identifying the correct word and then updating the appropriate matrix to reflect the typing error that was detected. For example, if the word "receive" was incorrectly typed as "recieve" (i.e., "ei" was reversed) in the corpus, then, with reference to FIG. 5 (the matrix for reversals), the number "60" found at the intersection of y=i and x=e would be updated by 1 (i.e., 60+1). The other three matrices were generated in the same manner to reflect character deletions, insertions and substitutions.

The combination existence information chars[x,y] and chars[x] in the above Table C are found in FIGS. 6 and 7 respectively. FIG. 6 shows the number of times the character x was followed by character y in the corpus, and FIG. 7 shows the number of times each character was observed in the corpus.

The special symbol "@" found in FIGS. 2, 3, 6 and 7 is attached to the beginning of each word and refers to a null string. Thus, in FIG. 3, for example, the cell circled "Example B" refers to the insertion of the letter "a" after the beginning of a word.

After the second probability number Pr (typo|cor) is derived by reference to the appropriate matrix in accordance with Table C, an overall probability, which is a function of the first (Pr(correction)) and second (Pr(typo|cor)) probability numbers, is derived for each candidate word (step 15, FIG. 1). In this illustrative embodiment, the first and second probability numbers are multiplied together to generate the overall probability. Others skilled in the art may elect to weigh the two probabilities differently in generating the overall probability and, due to memory, processing or other constraints, may elect to use one or other by itself as the overall probability.

Once the overall probabilities have been generated for all candidate expressions, the expressions can be rank ordered and sorted to meet the intended use. The misspelled word can be replaced, with or without human intervention, by the candidate with the highest probability, or the candidate expressions may be proffered as suggested corrections in an ordered list in descending order of probability (step 16, FIG. 1).

The derivation of probability figures in my illustrative embodiment will now be described in detail with respect to the example in Table A above. Table D below illustrates how the first, second and overall probability figures are generated for each of the seven candidate expressions discussed previously for the misspelled word "acress". With reference to Example A (e.g., "actress"), the probability (Pr(cor)) of the word "actress" occurring in the text (i.e., Pr(actress)= (freq(actress) +1)/N) is derived by adding 1 to 1343, which is number of times "actress" appeared in the corpus (not shown), and then dividing the sum by 32,000,000, the number of words in the corpus. Since the deletion transformation is used to generate the misspelled word "acress" from the candidate expression "actress", the second probability figure (Pr(type|cor))is derived by reference to the deletion portion of Table C above. More specifically, the second probability figure (Pr(type|cor)) for "actress" (i.e., Pr(acress|actress)=del[c,t]/chars[c,t])), which reflects the likelihood of deleting t after c, is derived with reference to the deletion table in FIG. 2 and the characters table in FIG. 6 where x=c and y=t. FIG. 2 shows that this character modification occurred 55 times in the corpus, and FIG. 6 shows that the character combination "ct" occurred 470573 times in the corpus (see circled cell in each of these figures labeled "Example A"). Thus, in Table D, Pr(acress|actress)= 55/470573. The overall probability in Table D for "actress" is derived by multiplying together (and thereby giving equal weight to) the two calculated probability figures (e.g., Pr(actress) x Pr(acress|actress)) resulting in an "overall probability" of $49 \times 10^{-10}$.

TABLE D

| Example | Typo | Cor | Transform | Pr(cor) | Pr(typo\|cor) | Overall ($\times 10^{-10}$) Probability | Normalized Score |
|---|---|---|---|---|---|---|---|
| A | acress | actress | delete t after c | 1344/32,000,000 | 55/470,573 | 49 | 37% |
| B | acress | cress | insert a after @ | 1/32,000,000 | 46/32,158,917 | ~0 | 0% |
| C | acress | caress | reverse ca | 5/32,000,000 | 1/581,247 | ~0 | 0% |
| D | acress | access | substitute r for c | 2281/32,000,000 | 1/4,747,178 | ~0 | 0% |
| E | acress | across | substitute e for o | 8437/32,000,000 | 93/10,234,105 | 24 | 18% |
| F | acress | acres | insert s after e | 2880/32,000,000 | 417/13,128,963 | 29 | 22% |
| G | acress | acres | insert s after s | 2880/32,000,000 | 205/6,009,135 | 31 | 23% |

The probability figures in Example B (e.g., "cress") in Table D are similarly generated. Pr(cress)=(freq(cress)+1)/N or 0+1/32,000,000. The "0" indicates that "cress" was not found in the corpus. With reference to the "insertion" equation in Table C, Pr(acress|cress)=add[@,a]/chars[@] or 46/32,158,917 since FIG. 3 (the insertion matrix) indicates that "a" was inserted 46 times after "@", the special character denoting the beginning of a word, and FIG. 7 indicates that "@" (beginning of word) was observed 32,158,917 times.

The other examples C–G in Table D are self-explanatory. FIGS. 2–7 identify, by designation to each example by the use of circled cells, the derivation of the numbers found in the Table D (with the exception of freq(correction)).

The "normalized scores" in Table D, derived by simply averaging all the overall probability numbers, indicate that (1) the words "cress", "caress", and "access" are implausible since each of their overall probabilities was nearly zero, (2) the words "actress", "across", and "acres" are plausible with overall probabilities of 37%, 18%, and 45% (i.e, 22%+23%) respectively, and (3) "acres" is the most likely candidate expression followed by "actress".

It, of course, is understood that one skilled in the art could utilize the inventive concepts discussed in a wide variety of other embodiments without departing from the spirit and scope of my invention. For example, my invention works equally well with character based foreign languages, such as, for instance, Spanish, French and German.

I claim:

1. In an automatic machine, a method of correcting incorrectly-spelled words in an object text stored in a memory wherein an incorrectly-spelled word is identified and a plurality of correctly-spelled candidate expressions is generated to replace said incorrectly-spelled word, which comprises:

determining a probability function for each candidate expression, said probability function being based on both (1) a first stored probability of occurrence of said candidate expression in text independent of context and (2) a second stored probability of occurrence of the particular typographical modification that, when applied to said candidate expression, results in said incorrectly-spelled word, said first stored probability being computed from the number of occurrences of said candidate word in a large body of text in relation to the total number of words in said large body of text, said second probability being computed from the number of occurrences of said particular typographical modification in a training text containing known incorrectly-spelled words in relation to the total number of occurrences in said training text of the character or combination of characters modified by said particular typographical modification, and replacing said incorrectly-spelled word in said stored object text with the candidate expression having the highest probability function.

2. In an automatic machine, a method of suggesting corrections for incorrectly-spelled words in an object text stored in a memory wherein ann incorrectly-spelled word is identified and a plurality of correctly-spelled candidate expressions is generated to replace said incorrectly-spelled word, which comprises:

determining a probability function for each candidate expression, said probability function being based on both (1) a first stored probability of occurrence of said candidate expression in text independent of context and (2) a second stored probability of occurrence of the particular typographical modification that, when applied to said candidate expression, results in said incorrectly-spelled word, said first stored probability being computed from the number of occurrences of said candidate word in a large body of text in relation to the total number of words in said large body of text, said second probability being computed from the number of occurrences of said particular typographical modification in a training text containing known incorrectly-spelled words in relation to the total number of occurrences in said training text of the character or combination of characters modified by said particular typographical modification, and displaying said candidate expressions in descending rank order of their probability functions.

3. A method of using a computer to correct misspelled words in an object text, comprising the steps of:

storing, in memory means accessible to said computer, said object text, a dictionary of acceptable words and a table containing probabilities of occurrence of said acceptable words, the probability for each acceptable word being computed from the number of occurrences of said acceptable word in a large body of text in relation to the total number of words in said large body of text, comparing each word of said object text with said acceptable words and identifying as misspelled each word of said text for which a match cannot be found, for each misspelled word, generating a plurality of candidate words to replace said misspelled word by adding, deleting, substituting and transposing characters in said misspelled word and verifying that each candidate word appears in said dictionary, retrieving from said table the probability of occurrence of each candidate word and replacing said misspelled word in said stored object text with the candidate word associated with the highest probability of occurrence.

4. A method of using a computer to correct misspelled words in an object text, comprising the steps of:

storing, in memory means accessible to said computer, said object text, a dictionary of acceptable words, a first table containing probabilities of occurrence of said acceptable words and a second table containing probabilities of occurrence of particular typographical errors, the probability in said first table for each acceptable word being computed from the number of occurrences of said acceptable word in a large body of text in relation to the total number of words in said large body of text, the probability in said second table for each particular typographical error being computed from the number of occurrences of said particular typographical error in a training text containing known typographical errors in relation to the total number of occurrences in said training text of the character or combination of characters involved in said typographical error, comparing each word of said object text with said acceptable words and identifying as misspelled each word of said text for which a match cannot be found, for each said misspelled word, generating a plurality of candidate words to replace said misspelled word by adding, deleting, substituting and transposing characters in said misspelled word and verifying that each candidate word appears in said dictionary, for each candidate word, retrieving from said first table the probability of occurrence of said candidate word and from said second table the probability of occurrence of the particular typographical error that, when applied to said candidate word, results in said misspelled word, for each candidate word, calculating a probability function based on said retrieved probabilities, and replacing said misspelled word in said stored object text with the candidate word having the highest probability function.

5. A method of using a programmed computer to correct incorrectly spelled words in an object text, comprising the steps of:

storing, in memory means accessible to said computer, said object text, a dictionary of acceptable words, a first table containing probabilities of occurrence of said acceptable words independent of context and a second table containing probabilities of occurrence of particular typographical errors, the probability in said first table for each acceptable word being computed from the number of occurrences of said acceptable word in a large body of text in relation to the total number of words in said large body of text, the probability in said second table for each particular typographical error being computed from the number of occurrences of said particular typographical error in a training text containing known typographical errors in relation to the total number of occurrences in said training text of the character or combination of characters involved in said particular typographical error, comparing each word of said object text with said acceptable words and identifying as an incorrectly spelled word each word of said text for which a match cannot be found, for each said incorrectly spelled word, creating a plurality of correctly-spelled candidate words to replace said incorrectly spelled word by adding, deleting, substituting and transposing characters in said incorrectly spelled word and verifying that each candidate word appears in said dictionary, for each candidate word, retrieving both (1) the probability from said first table associated with said candidate expression and (2) the probability from said second table associated with the particular typographical error that, when applied to said candidate word, results in said incorrectly spelled word, for each candidate word, calculating a probability function based on said retrieved probabilities, and replacing said incorrectly spelled word in said stored object text with the candidate word having the highest probability function.

6. A method of using a programmed computer to suggest candidate words as replacements for incorrectly-spelled words in an object text, comprising the steps of:

storing, in memory means accessible to said computer, said object text, a dictionary of acceptable words a first table containing probabilities of occurrence of said acceptable words independent of context and a second table containing probabilities of occurrence of particular typographical errors, the probability in said first table for each acceptable word being computed from the number of occurrences of said acceptable word in a large body of text in relation to the total number of words in said large body of text, the probability in said second table for each particular typographical error being computed from the number of occurrences of said particular typographical error in a training text containing known typographical errors in relation to the total number of occurrences in said training text of the character or combination of characters involved in said particular typographical error, comparing each word of said object text with said acceptable words and identifying as an incorrectly-spelled word each word of said text for which a match cannot be found, for each incorrectly-spelled word, creating a plurality of correctly-spelled candidate words to replace said incorrectly-spelled word by adding, deleting, substituting and transposing the characters in said incorrectly-spelled word and verifying that each candidate word appears in said dictionary, for each candidate word, retrieving both (1) the probability from said first table associated with said candidate expression and (2) the probability from said second table associated with the particular typographical error that, when applied to said candidate word, results in said incorrectly-spelled word, for each candidate word, calculating a probability function based on said retrieved probabilities, and displaying said candidate expressions in descending rank order of their associated probability functions.

* * * * *